July 20, 1937.  N. TRBOJEVICH  2,087,364
UNIVERSAL JOINT
Filed March 2, 1936
FIG.1.
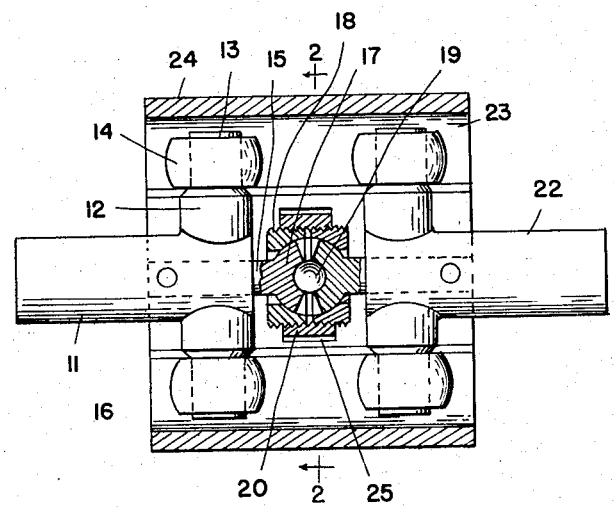
FIG.2.
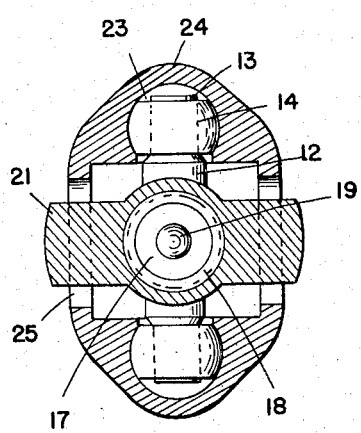
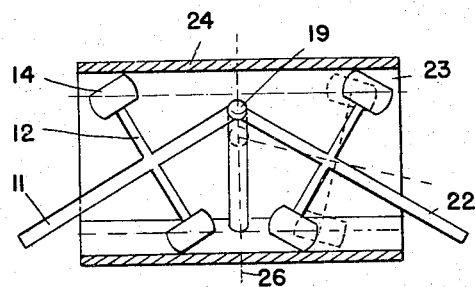
FIG.3.
INVENTOR
NIKOLA TRBOJEVICH
BY
ATTORNEYS Patented July 20, 1937

2,087,364

UNITED STATES PATENT OFFICE 2,087,364

UNIVERSAL JOINT

Nikola Trbojevich, Detroit, Mich.

Application March 2, 1936, Serial No. 66,663

3 Claims. (Cl. 64—21)

The invention relates to an improvement in universal joints of the anti-friction and constant velocity type.

One of the objects of the invention is to obtain a new type universal joint which has strictly constant velocity in both shafts.

Another object is to construct a joint capable of sustaining high loads and speeds and permitting of a considerable angular variation.

The principle upon which this joint is designed is to my knowledge new and unusual in that the joint is not designed about a sphere as was formerly customary, but consists essentially of two crosses sliding in a double barreled tube and so constrained as to remain in a symmetrical position relative to the said tube at all times. By this means I obtain a strictly constant velocity in both shafts.

In the drawing:

Figure 1 is the principal cross section of my improved joint with drive shafts aligned;

Figure 2 is a section taken in the plane 2—2 of Figure 1;

Figure 3 is a diagram explanatory of the geometrical principle involved and drawn in the same plane as Figure 1.

As shown in Figures 1 and 2, the drive shaft 11 is integral with the crosspin 12 at right angles thereto, the latter terminating in two symmetrically disposed journals 13, each rotatably carrying a truncated spherical roller 14. Coaxially with the shaft 11 a center stud 15 is driven in the hole provided in the said shaft and secured in that position by means of the pin 16. The outer end of the said stud is formed into a spherical sector 17 capable of contacting with the spherical ring 18 on its outside and with a ball 19 on its inside. The spherical ring 18 is threaded on its outside and fits into the corresponding threaded hole of the sliding key 20, the latter having two rectangular extensions 21 as shown in Figure 2.

The driven shaft 22 with all its accessories is an exact duplicate of the above described drive shaft 11.

The rollers 14 closely fit into the two cylindrical grooves 23 formed in the sleeve 24. The said sleeve is also provided with two rectangular slots 25 in its midportion and perpendicular to its axis which permit the key extensions 21 to slide therein right and left, and up and down, Figure 2, but cannot get out of that midplane.

In assembling the joint I first slip the rings 18 upon the studs 15, then insert the studs 15 and the pins 16, insert the key 20 in the slot 25, slip in the ball 19 and tighten the rings 18 until only a slight backlash remains. The rings may be secured in position by a small key or pin not shown in the drawing.

The theory of this joint is based on the fact that if I first mount the drive shafts 11 and 22 in such a manner that they are spherically rotatable about the ball 19, their point of intersection, if I further constrain the said point of intersection always to remain in the plane 26, Figure 3, and also constrain the four rollers 14 to remain in lines perpendicular to the said plane, a condition will be created, necessary and sufficient, to cause the shaft 22 to respond as an image in a mirror (the plane 26) to any and all possible motions of the shaft 11. Thus, if I hold the shaft 11 in position and tilt the shaft 22 to any angle whatever in the plane of paper or perpendicularly thereto, the plane 26 will assume a position exactly bisecting the shaft angle. It is readily seen from this general symmetry of the mechanism that upon uniformly rotating the shaft 11 at any shaft angle whatever within the limits of the device, the shaft 22 will also rotate uniformly and with the same angular velocity. It is also to be noted that while the two shafts rotate each with a uniform velocity, the sleeve 24 rotates with a variable velocity. For this reason I design the sleeve of as small a mass as possible.

What I claim as my invention is:

1. A universal joint comprising two shafts intersecting each other in a spherical joint, means for constraining the motion of the said point of intersection in a plane, a cylindrical sleeve provided with a plurality of longitudinal grooves attached to and perpendicular to the said plane and a plurality of drive arms extending from their respective shafts and slidably fitting into the said grooves of the sleeve.

2. A universal joint comprising two shafts intersecting each other in a spherical joint, two driving arms attached to each shaft, a cylindrical sleeve having two grooves diametrically disposed and slidably housing the extremities of the said four drive arms, and a sliding member housing the said spherical joint and guiding it in a plane perpendicular to the said sleeve.

3. A universal joint comprising a double barreled cylindrical sleeve, a spherical joint slidable in a plane perpendicular to the said sleeve, two shafts connected to the said joint and also carrying two drive arms each, the extremities of which arms are slidable in the said two barrels of the sleeve.

NIKOLA TRBOJEVICH.